(12) United States Patent
Farrell et al.

(10) Patent No.: US 8,399,099 B1
(45) Date of Patent: *Mar. 19, 2013

(54) COATING COMPOSITIONS

(75) Inventors: David Farrell, Kingswood (IE); Ciaran B. McArdle, Dublin (IE); Michael Doherty, Carndonagh Co. Donegal (IE)

(73) Assignee: Henkel Ireland Limited, Monheim (DE)

( * ) Notice: Subject to any disclaimer, the term of this patent is extended or adjusted under 35 U.S.C. 154(b) by 705 days.

This patent is subject to a terminal disclaimer.

(21) Appl. No.: 12/470,858

(22) Filed: May 22, 2009

Related U.S. Application Data (60) Provisional application No. 61/055,551, filed on May 23, 2008.

(51) Int. Cl.
  *B32B 15/04* (2006.01)
  *B32B 15/08* (2006.01)
  *B32B 15/082* (2006.01)
  *B32B 27/18* (2006.01)
  *B32B 27/26* (2006.01)

(52) U.S. Cl. ........ 428/418; 428/413; 428/446; 428/447; 428/450; 428/457; 428/461; 428/688; 428/689; 428/702; 428/704; 427/372.2; 427/384; 427/385.5; 427/386; 427/387; 427/388.2; 524/401; 524/408; 524/409; 524/411; 524/413; 524/414; 524/434; 524/435; 524/379

(58) Field of Classification Search .................. None
  See application file for complete search history.

(56) References Cited

U.S. PATENT DOCUMENTS

| | | | | |
|---|---|---|---|---|
| 2,628,178 A | * | 2/1953 | Nordlander et al. | 428/430 |
| 2,895,950 A | * | 7/1959 | Krieble | 526/323.1 |
| 3,218,305 A | * | 11/1965 | Krieble | 526/320 |
| 3,435,012 A | * | 3/1969 | Nordlander | 526/270 |
| 4,054,480 A | * | 10/1977 | Skoultchi et al. | 156/331.2 |
| 4,216,288 A | * | 8/1980 | Crivello | 430/280.1 |
| 4,446,246 A | * | 5/1984 | McGinniss | 502/155 |
| 4,593,052 A | * | 6/1986 | Irving | 522/31 |
| 4,717,440 A | | 1/1988 | Drain et al. | |
| 4,921,827 A | * | 5/1990 | Ali et al. | 502/167 |
| 4,971,892 A | * | 11/1990 | Ali et al. | 430/281.1 |

(Continued)

FOREIGN PATENT DOCUMENTS

| | | |
|---|---|---|
| EP | 0428124 A1 | 5/1991 |
| EP | 0764690 B1 | 6/1999 |

(Continued)

OTHER PUBLICATIONS

Haviland, G.S.; "Machinery Adhesives for Locking Retaining & Sealing", (1986).

(Continued)

*Primary Examiner* — Vivian Chen
(74) *Attorney, Agent, or Firm* — Steven C. Bauman (57) ABSTRACT

The present invention relates to cationically and radically curable coating compositions for coating a surface. The coating compositions consist essentially of a radically or cationically curable monomer, and a metal salt. The metal salt is chosen so that it is reduced at the surface to be coated, and where the standard reduction potential of the metal salt is greater than the standard reduction potential of the surface, and where when the composition is placed in contact with the surface, the metal salt of the composition is reduced at the surface, thereby initiating cure of the curable component in the compositions. Redox mediated cure of the coating compositions results in a coating or film on the surface. The invention also provides for functionalization of surfaces. Cross-linking of the coating occurs directly on the surface.

16 Claims, 4 Drawing Sheets

U.S. PATENT DOCUMENTS

| | | | |
|---|---|---|---|
| 5,004,842 A | | 4/1991 | Klemarczyk et al. |
| 5,135,780 A | * | 8/1992 | Kissel ............................ 427/404 |
| 5,252,694 A | * | 10/1993 | Willett et al. .................... 522/13 |
| 5,310,840 A | * | 5/1994 | Willett et al. .................... 526/273 |
| 5,362,421 A | * | 11/1994 | Kropp et al. .................... 252/512 |
| 5,369,139 A | * | 11/1994 | Boeckeler et al. ............... 522/21 |
| 5,399,637 A | * | 3/1995 | Willett et al. .................... 526/142 |
| 5,453,450 A | * | 9/1995 | Kinzer et al. .................... 522/18 |
| 5,500,453 A | * | 3/1996 | Toba et al. ....................... 522/25 |
| 5,506,326 A | * | 4/1996 | Kneafsey ......................... 526/320 |
| 5,514,728 A | * | 5/1996 | Lamanna et al. ................ 522/31 |
| 5,521,227 A | * | 5/1996 | Palazzotto et al. ................ 522/4 |
| 5,523,347 A | * | 6/1996 | Kneafsey et al. ................ 525/49 |
| 5,691,846 A | | 11/1997 | Benson, Jr. et al. |
| 5,739,232 A | * | 4/1998 | Hazell et al. .................... 526/240 |
| 6,265,459 B1 | | 7/2001 | Mahoney et al. ............... 522/17 |
| 6,482,868 B1 | * | 11/2002 | Mahoney et al. ............... 522/17 |
| 6,552,140 B1 | | 4/2003 | Kneafsey et al. |
| 6,635,689 B1 | * | 10/2003 | Mahoney et al. ............... 522/18 |
| 6,777,027 B2 | * | 8/2004 | Daly et al. ..................... 427/180 |
| 7,210,763 B2 | | 5/2007 | Kato et al |
| 7,309,122 B2 | | 12/2007 | Nakajima et al. |
| 2006/0167127 A1 | * | 7/2006 | Nguyen et al. .................. 522/81 |
| 2006/0199028 A1 | * | 9/2006 | Chernyshov et al. ......... 428/500 |
| 2006/0257727 A1 | | 11/2006 | Uetani et al. |
| 2009/0288769 A1 | * | 11/2009 | Farrell et al. .................... 156/330 |
| 2009/0288770 A1 | * | 11/2009 | Farrell et al. .................... 156/332 |
| 2009/0288771 A1 | * | 11/2009 | Farrell et al. .................... 156/332 |
| 2010/0113639 A1 | | 5/2010 | Doering et al. |
| 2011/0297318 A1 | * | 12/2011 | Barriau et al. ................ 156/330 |

FOREIGN PATENT DOCUMENTS

| | | |
|---|---|---|
| EP | 1757633 B1 | 2/2007 |
| JP | 56168862 A | 12/1981 |
| JP | 57180618 | 11/1982 |
| JP | 04120182 A | 4/1992 |
| JP | 08058023 A | 3/1996 |
| WO | 2005070671 A2 | 8/2005 |

OTHER PUBLICATIONS

Holtzclaw, H.F.; Robinson W.R.; Odom, J.D.; General Chemistry, 1991, 9$^{th}$ Ed., Heath (Pub.), p. 44.

J.V. Crivello and J. L. Lee, *Makromol, Chem.*, 184, 463-473 (1983).

International Search Report issued against International Patent Application No. PCT/EP2009/056256 mailed on Aug. 5, 2009.

J.V. Crivello et al., "Redox Cationic Polymerization: The Diaryliodonium Salt/Ascorbate Redox Couple", *J. Polym. Sci.*, 19, pp. 539-548 (1981).

J.V. Crivello et al., Redox-Initiated Cationic Polymerization: The Diaryliodonium Salt/Benzoin Redox Couple, *J. Polym. Sci.*, 21, pp. 1097-1110 (1983).

J. Collomb et al., "Cationic Polymerization Induced By Metal Salts-I", *European Poly. J.*, vol. 16, pp. 1135-1144 (1980).

J. Collomb et al., "Cationic Polymerisation Induced by Metal Salts 2a). A Preliminary Communication on Homogeneous Systems", *Makromol. Chem. Rapid Commun.*, 1, pp. 489-491 (1980).

P. Castell et al., "Study of lanthanide Triflates As New Curing Initiators for DGEBA", *Polymer* 41, pp. 8465-8474 (2000).

S. Moane et al., "Decomposition of Peroxides by Transition Metal Ions in Anaerobic Adhesive Cure Chemistry", *Int. J. Adh. & Adh.*, 19, pp. 49-57 (1999).

Rich, R.; Handbook of Adhesive Technology ed. Pizzi, A. & Mittal, K.L., Marcel Dekker (Pubs.), Chap. 29, pp. 467-79 (1994).

M.S. Kharash et al., "The Chemistry of Hydroperoxides. XI. Hydroperoxides as Oxiding and Reducing Agents", *J. Org. Chem.*, vol. 17, pp. 207-220 (1952).

Holtzclaw, H.F.; Robinson, W.R.; Odom, J.D.; General Chemistry, 1991, 9$^{th}$ Ed., Heath (Pub.), p. 44.

International Search Report, dated Jul. 31, 2009, International Application PCT/EP2009/056257.

International Search Report, dated May 26, 2010, International Application PCT/EP2010/051611.

* cited by examiner

COATING COMPOSITIONS

This Application claims the benefit of Provisional Application No. 61/055,551, filed May 23, 2008.

FIELD OF THE INVENTION

Compositions for coating and functionalising surfaces are described.

DISCUSSION OF BACKGROUND ART

Existing Coating Technologies

E-Coating (Electrocoating/Electrodeposition coating) is a method of painting which uses electrical current to deposit the paint. The process works on the principal of "Opposites Attract". This process is also known as electrodeposition. The fundamental physical principle of electrocoat is that materials with opposite electrical charges attract each other. An electrocoat system applies a DC charge to a metal part immersed in a bath of oppositely charged paint particles. The paint particles are drawn to the metal part and paint is deposited on the part, forming an even, continuous film over every surface, in every crevice and corner, until the electrocoat reaches the desired thickness. At that thickness, the film insulates the part, so attraction stops and the electrocoat process is complete. Depending on the polarity of the charge, electrocoat is classified as either anodic or cathodic. A major disadvantage of this technology is that it suffers from the Faraday Cage effect so cannot coat inside metallic tubes etc. It is necessary to bake the material in order to cross-link and cure the paint film.

The present inventors aim to utilise Redox chemistry as an alternative coating technology. Some existing Redox technologies for curing are discussed hereinbelow.

Reduction-Oxidation (Redox) Polymerisation

RedOx polymerizations involve oxidation and reduction processes [Holtzclaw, H. F.; Robinson, W. R.; Odom, J. D.; *General Chemistry*, 1991, 9$^{th}$ Ed., Heath (Pub.), p. 44]. When an atom, either free or in a molecule or ion, loses an electron or electrons, it is oxidised and its oxidation number increases. When an atom, either free or in a molecule or ion, gains an electron or electrons, it is reduced and its oxidation number decreases. Oxidation and reduction always occur simultaneously, as if one atom gains electrons then another atom must provide the electrons and be oxidised. In a RedOx couple, one species acts as a reducing agent, the other as an oxidizing agent. When a RedOx reaction occurs the reducing agent gives up or donates electrons to another reactant, which it causes to be reduced. Therefore the reducing agent is itself oxidised because it has lost electrons. The oxidising agent accepts or gains electrons and causes the reducing agent to be oxidised while it is itself reduced. A comparison of the relative oxidising or reducing strengths of strength of the two reagents in a redox couple permits determination of which one is the reducing agent and which one is the oxidising agent. The strength of reducing or oxidising agents can be determined from their standard reduction)($E_{red}^0$) or oxidation ($E_{ox}^0$) potentials.

Redox Cationic Polymerisation

Onium salts have been widely used in cationically curable formulations. Extensive investigation into the use of onium salts as photoinitiators for cationic polymerisation led to the realisation that during the course of the photochemical reaction the onium cation undergoes photochemical reduction. In particular, diaryliodonium salts have been used in cationically curable formulations. Extensive investigation into the use of diaryliodonium salts (1) as photoinitiators for cationic polymerisation led to the realisation that during the course of the photochemical reaction iodine undergoes a reduction in oxidation state from +3 to +1.

(1)

In J. V. Crivello and J. H. W. Lam, *J. Polym. Sci.*, 1981, 19, 539-548, it is proposed that the action of light on the diaryliodonium salt liberates radical intermediates, see Scheme 1. A resulting cascading series of reactions results in reduction of the oxidation state of iodine in the diaryliodonium salt. The aryliodine cation radicals generated during the photolysis process are extremely reactive species and react with solvents, monomers, or impurities (denoted SH in the scheme) to produce a protonic acid. The protonic acid in turn reacts with the cationically curable monomer resulting in polymerisation.

Scheme 1

Diaryliodonium salts as initiators of cationic polymerisation via RedOx type chemistry have also been the subject of investigation. The general premise here was that, in the presence of a chemical reducing agent, the iodine component of the diaryliodonium salt could be reduced resulting in the generation of the protonic acid species HX, as shown in Scheme 2 (below), which will in turn initiate cationic polymerisation.

Scheme 2

Diaryliodonium salt/reducing agent couples incorporating ascorbic acid (J. V. Crivello and J. H. W. Lam, *J. Polym. Sci.*, 1981, 19, 539-548), benzoin (J. V. Crivello and J. L. Lee, *J. Polym. Sci.*, 1983, 21, 1097-1110), and tin (J. V. Crivello and J. L. Lee, *Makromol. Chem.*, 1983, 184, 463-473) have been investigated. Direct reduction of the iodonium salt (an onium salt) by the reducing agent is extremely inefficient. Consequently, there is the need to incorporate a copper catalyst in order to achieve efficient polymerization. Thus, such RedOx cationic initiation packages are effectively three component systems—the salt, the reducing agent and the catalyst.

The so-described RedOx systems thus suffer from the drawback that direct reduction of the "onium" salt by the reducing agent is highly inefficient. Copper salts were required for efficient electron transfer. However, even in the absence of a catalyst very slow electron transfer between the reducing agent and the onium salt is observable rendering compositions having reducing agent and onium salt together in a composition inappropriate for long-term storage. There is thus still an unsatisfied need for suitable curable formulations which provide alternatives to the conventional onium formulations set out above.

Lewis Acid Metallic Salts as Initiators for Cationic Polymerisation

Lewis acids in the form of metal salts have been used as initiators of cationic polymerization (Collomb, J. et al.; *Eur. Poly. J.*, 1980, 16, 1135-1144; Collomb, J.; Gandini, A.; Cheradamme, H.; *Macromol. Chem. Rapid Commun.*, 1980, 1, 489-491). Many strong Lewis acid initiators have been shown to function by the direct initiation of the monomer (Scheme 3) (Coulomb, J.; Gandini, A.; Cheradamme, H.; *Macromol. Chem. Rapid Commun.*, 1980, 1, 489-491). The stronger the Lewis acid the more pronounced is its initiating power.

Scheme 3

Not all Lewis acid metal salts react with cationically polymerizable monomers. Many can be formulated as the initiating component in storage stable one-component cationically polymerizable systems (Castell, P. et al.; *Polymer*, 2000, 41(24), 8465-8474). In these instances decomposition of the initiator and activation of polymerization is typically achieved by thermal or electromagnetic radiation curing processes (Castell, P. et al.; *Polymer*, 2000, 41(24), 8465-8474).

There is thus still an unsatisfied need for suitable curable formulations which provide alternatives to the conventional Lewis acid metal salt formulations set out above, which will cure in the absence of thermal or electromagnetic radiation curing processes.

Redox Radical Polymerisation

Redox radical polymerisation for example in the field of anaerobic acrylate adhesive formulations is an established adhesives technology (U.S. Pat. Nos. 2,628,178; 2,895,950; 3,218,305; and 3,435,012). Anaerobic adhesive formulations are used in a wide range of industrial applications including thread-locking, flange sealing, structural bonding, and engine block sealing amongst others (Haviland, G. S.; *Machinery Adhesives for Locking Retaining & Sealing*, Marcel Dekker (Pubs.), New York 1986).

Anaerobic adhesive systems are typically composed of a radically susceptible monomer, an oxidising agent and a reducing agent (Rich, R.; *Handbook of Adhesive Technology* ed. Pizzi, A. & Mittal, K. L., Marcel Dekker (Pubs.), 1994, Chap. 29, 467-479). Typical oxidising agents are hydroperoxides of which cumene hydroperoxide ("CHP") is most commonly employed although others including t-butyl hydroperoxide ("BHP") are also used. In general the reducing agents consist of a mixture of an amine such as dimethyl-p-toluidine ("DMPT") and saccharin (Moane, S. et al.; *Int. J. Adh. & Adh.*, 1999, 19, 49-57), or acetylphenylhydrazine (APH) (Rich, R.; Handbook of Adhesive Technology ed. Pizzi, A. & Mittal, K. L., Marcel Dekker (Pubs.), 1994, Chap. 29, 467-479).

Incompatibility of Hydroperoxides with Transition Metal Salts

Hydroperoxides can function as oxidants, reductants or even both (Kharash, M. S. et al.; *J. Org. Chem.*, 1952, 17, 207-220). Several mechanisms for the oxidising action of a hydroperoxide include abstraction of a single electron, abstraction of a pair of electrons from an electron donor or through the donation of an oxygen atom to an acceptor (Kharash, M. S. et al.; *J. Org. Chem.*, 1952, 17, 207-220).

Hydroperoxides are known to be unstable in the presence of metallic salts in both their lower and higher oxidation states. It is this instability that is understood to contribute to their reactivity when used as the initiating component in anaerobic acrylate adhesives. Scheme 4 shows oxidative and reductive hydroperoxide decomposition by transition metal species in their higher and lower oxidation states.

Scheme 4

There is thus still an unsatisfied need for suitable hydroperoxide compatible radically curable formulations which provide alternatives to the amine/organic reducing agent formulations set out above. Furthermore, there is a need for one part radically curable compositions that will exhibit long-term stability and will only cure upon application to a target surface.

SUMMARY OF THE INVENTION

A method of coating surfaces addressing the limitations of existing coating and RedOx technologies is described below. By the present invention cross-linking and cure can be achieved directly on the surface, thus eliminating the necessity for an additional baking step. Moreover, the coating method may also allow coating of inside of surfaces, for example surfaces that can exhibit a Faraday Cage affect preventing coating inside tubes.

In one embodiment, the invention provides a stable one-part cationically curable coating composition for coating a surface comprising:
(i) a cationically curable component; and
(ii) an initiator component comprising at least one metal salt;
where the standard reduction potential of the initiator component is greater than the standard reduction potential of the surface, and
where when the composition is placed in contact with the surface, the metal salt of the initiator component of the composition is reduced at the surface, thereby initiating cure of the cationically curable component of the composition.

References to standard reduction potentials in this specification indicate the tendency of a species to acquire electrons and thereby be reduced. Standard reduction potentials are measured under standard conditions: 25° C., 1 M concentration, a pressure of 1 atm and elements in their pure state.

Desirably, the metal salt of the cationically curable coating composition comprises a transition metal cation. Suitable metals include silver, copper and combinations thereof. The metal salt may be substituted with a ligand. The metal salt counterions may be chosen from $ClO_4^-$, $BF_4^-$, $PF_6^-$, $SbF_6^-$, $AsF_6^-$, $(C_6F_5)_4B$ anion, $(C_6F_5)_4Ga$ anion, Carborane anion, triflimide (trifluoromethanesulfonate) anion, bis-triflimide anion, anions based thereon and combinations thereof. Further desirably, the metal salt counterions may be chosen from $ClO_4^-$, $BF_4^-$, $PF_6^-$, $SbF_6^-$ and combinations thereof.

The cationically curable component of the coating composition desirably has at least one functional group selected from epoxy, vinyl, vinyl ether, oxetane, thioxetane, episulfide, tetrahydrofuran, oxazoline, oxazine, lactone, trioxane, dioxane, styrene with combinations thereof also being embraced by the present invention. Further desirably, the cationically curable component has at least one functional group selected from vinyl ether, epoxy, oxetane, thioxetane, episulfide and combinations thereof. Preferably, the cationically curable component has at least one functional group selected from vinyl ether, epoxy, oxetane and combinations thereof.

The cationically curable coating compositions of the present invention may optionally contain fillers, dyes, pigments, and lubricating elements. Furthermore, the cationically curable coating compositions may include curable hydrophobic monomers, bifunctional monomers and secondarily curable components, including vulcanising agents and curatives. Modification of the curable monomer can be utilised to modulate the properties of the deposited film, facilitating the control of: surface tension and polarity, lubriciousness, tacticity, colour hardness, scratch resistance, surface reactivity to subsequent coatings and/or adhesives, and reactivity towards light, heat, moisture to promote further reaction within the surface deposited film itself or between the surface deposited film and a material in contact with same.

In a further embodiment, the present invention provides for a stable one-part radically curable coating composition for coating a surface comprising:

i) a radically curable component;
ii) a free radical generating component; and
iii) at least one metal salt;

where the standard reduction potential of the at least one metal salt is greater than the standard reduction potential of the surface, and where when the composition is placed in contact with the surface, the metal salt is reduced at the surface, and interacts with the free radical generating component, thereby initiating cure of the radically curable component of the composition.

Desirably the metal salt of the radically curable coating composition comprises a transition metal cation. Suitable metals include copper, iron, zinc and combinations thereof. The metal salt may be substituted with a ligand. Desirably, the metal salt counterion may be chosen from the group consisting of naphthenate, ethylhexanoate, benzoate, nitrate, chloride, acetylacetonate, $ClO_4^-$, $BF_4^-$, $PF_6^-$, $SbF_6^-$, $AsF_6^-$, $(C_6F_5)_4B$, $(C_6F_5)_4Ga$, Carborane, triflimide, bis-triflimide, anions based thereon and combinations thereof. Further desirably, the metal salt counterion may be chosen from naphthenate, ethylhexanoate, benzoate, nitrate, chloride, acetylacetonate, $ClO_4^-$, $BF_4^-$, $PF_6^-$, $SbF_6^-$ and combinations thereof. Preferably, the metal salt counterion may be chosen from $ClO_4^-$, $BF_4^-$ and combinations thereof.

The radical generating component of the coating composition may be selected from peroxides, hydroperoxides, hydroperoxide precursors, persulfates and combinations thereof. Suitable materials comprise cumene hydroperoxide, tert-butyl hydroperoxide, hydrogen peroxide, 2-butanone peroxide, di-tert-butyl peroxide, dicumyl peroxide, lauroyl peroxide, 2,4-pentanedione peroxide, Trigonox® 311 (3,3,5,7,7-pentamethyl-1,2,4-trioxepane), benzoyl peroxide and combinations thereof.

The radically curable component desirably has at least one functional group selected from acrylates, methacrylates, thiolenes, siloxanes, vinyls with combinations thereof also being embraced by the present invention. Preferably, the radically curable component has at least one functional group selected from acrylates, methacrylates, thiolenes and combinations thereof.

The radically curable coating compositions of the present invention may optionally contain fillers, dyes, pigments, and lubricating elements. Furthermore, the radically curable coating compositions may also include curable hydrophobic monomers, bifunctional monomers and secondarily curable components, including vulcanising agents and curatives. Modification of the curable monomer can be utilised to modulate the properties of the deposited film, facilitating the control of: surface tension and polarity, lubriciousness, tacticity, colour hardness, scratch resistance, surface reactivity to subsequent coatings and or adhesives, and reactivity towards light, heat, moisture to promote further reaction within the surface deposited film itself or between the surface deposited film and a material in contact with same.

The solubility of the metal salt in the radically and cationically curable coating compositions may be modified by changing the counterion, the addition and/or substitution of ligands to the metal of the metal salt and combinations thereof. This will allow for efficient electron transfer between the surface and the metal salt to be observed as appropriate solubility is achieved.

Desirably, the surfaces to which the coating compositions of the present invention (radically and cationically curable) are applied may comprise a metal, metal oxide or metal alloy. Further desirably, the surface may comprise a metal or metal oxide. Preferably, the surface may comprise a metal. Suitable surfaces can be selected from iron, steel, mild steel, grit blasted mild steel, aluminium, aluminium oxide, copper, zinc, zinc oxide, zinc bichromate, and stainless steel. References to aluminium and aluminium oxide include alclad aluminium (low copper content), and oxide removed alclad aluminium (low copper content) respectively. Desirably, the surface can be selected from the group consisting of steel and aluminium.

Metal salts suitable for use in cationic coating compositions for coating on steel or aluminium surfaces may be chosen from silver salts, copper salts and combinations thereof, and where the counterions of the silver and copper salts may be chosen from $ClO_4^-$, $BF_4^-$, $PF_6^-$, $SbF_6^-$ and combinations thereof. Metal salts suitable for use in radical coating compositions for steel or aluminium surfaces may be chosen from iron salts, copper salts, zinc salts and combinations thereof, and where the counterions of the iron, copper and zinc salts may be chosen from naphthenate, ethylhexanoate, benzoate, nitrate, chloride, acetylacetonate, $ClO_4^-$, $BF_4^-$ and combinations thereof.

Further desirably, the metal of the metal salt of the inventive compositions (radically and cationically curable) is lower in the reactivity series than the metal surface on which it is to be cured. Thus, the inventive compositions allow for coating on a number of different metal surfaces.

All references to the term "coating" in this specification shall be interpreted to comprise a polymeric film or coating on a surface. In addition, all references to a functionalized polymeric films or coatings below apply to both cross-linked and non cross-linked coatings.

It will be appreciated that the curable component can be functionalized to confer desirable properties on the polymerised film. The monomer can be modified to control the following characteristics of the coatings; surface tension and polarity, lubriciousness, tacticity, colour hardness, scratch resistance, and reactivity to subsequent coatings and/or adhesives. Moreover, the functionalized coating could be subjected to stimuli such as light, heat, and moisture, to encourage further reaction within the surface deposited coating itself or between the surface deposited coating and a material in contact with same.

For example, a radically curable monomer functionalized with a cationically curable monomer to create a dual curable system; a cationically curable monomer functionalized with a radically curable monomer to create a dual curable system; a cationically/radically curable monomer functionalized with secondary curable components, including vulcanising agents and curatives, a coating functionalized for control of surface tension and polarity, lubriciousness, tacticity, colour hardness, scratch resistance, reactivity to subsequent coatings and/or adhesives, reactivity towards light, heat, and moisture, to promote further reaction within the surface deposited film itself or between the surface deposited film and a material in contact with same.

The RedOx cationically curable coating compositions discussed herein do not require any additional reducing agent. They are stable until contacted with a metallic substrate which is capable of participating in a RedOx reaction (or other surface capable of participating in a RedOx reaction), thus fulfilling the role of a conventional reducing agent component. The RedOx cationically curable coating compositions of the invention are storage stable as a one-part composition and require no special packaging unlike prior art compositions, which tend to be multi-component compositions.

The RedOx radically curable coating compositions discussed herein do not require any additional reducing agent. They are stable until contacted with a metallic substrate which is capable of participating in a RedOx reaction (or other surface capable of participating in a RedOx reaction), thus fulfilling the role of a conventional reducing agent component. The radically curable compositions of the invention are storage stable as a one-part composition when stored in air permeable containers. The stability of large volumes of the radically curable coating compositions of the present invention can be improved by continuous agitation and/or bubbling air through the composition.

The coating compositions of the present invention (cationically and radically curable) do not require an additional catalyst for efficient curing. The present invention utilizes appropriate selection of the metal salt component relative to the surface on which the coating composition is to be applied and cured. However, it will be appreciated that coating compositions according to the invention may optionally comprise a catalyst to effect electron transfer between the surface and the metal salt of the composition. This may be useful where even greater cure speeds are required. Suitable catalysts include transition metal salts.

The kinetics of polymerisation/film formation is proportional to the difference in standard reduction potential between the surface and the metal salt in the composition. Cross-linking is achieved directly on the surface. However, it will be appreciated that a post polymerisation baking step can be applied.

The invention further extends to a method of coating a substrate comprising applying a coating composition comprising:
  i) a cationically curable component; and
  ii) an initiator component comprising at least one metal salt; to the substrate,
  where the standard reduction potential of the initiator component is greater than the standard reduction potential of the surface.

Similarly, the invention provides for a method of coating a substrate comprising applying a coating composition comprising:
  i) a radically curable component;
  ii) a free radical generating component; and
  iii) at least one metal salt;
  to the substrate,
  where the standard reduction potential of the at least one metal salt is greater than the standard reduction potential of the surface.

It will be appreciated that the method of coating a substrate, utilising radical and cationic compositions of the present invention, may further comprise the steps of:
  i) cleaning the substrate prior to application of the coating composition;
  ii) dipping the substrate into said coating composition of the present invention or an emulsion of said coating composition; and
  iii) rinsing the coated substrate when polymerisation is complete.

The step of cleaning the substrate may comprise washing with acid, base, detergent, aqueous solutions, water, deionised water, organic solvents and combinations thereof. The emulsion of the coating composition of the present invention, referred to in step (ii) may comprise an aqueous or an organic emulsion. The step of rinsing the coated substrate may comprise rinsing with water and/or rinsing with a rinsing solution beneficial to the properties of the coating/film.

The invention also relates to a pack comprising:
  a) a container; and
  b) a cationically curable coating composition according to the present invention.
where the container may be air permeable. Alternatively, the container may not air permeable.

Similarly, the invention relates to a pack comprising:
  a) a container; and
  b) a radically curable coating composition according to the present invention.
where the container is air permeable.

The invention further extends to a coating applied to a metallic substrate utilising the methods (radical and cationic) discussed above.

The invention further extends to a coated article comprising:
  i) a coating applied to a metallic substrate utilising the methods (radical and cationic) discussed above; and
  ii) a substrate comprising a metallic component.

Furthermore, the coated article may have a curable composition applied thereto, thus facilitating mating with a second substrate. The coated article may have a second substrate adhered thereto.

DETAILED DESCRIPTION OF THE INVENTION

The electrochemical series is a measure of the oxidising and reducing power of a substance based on its standard potential. The standard potential of a substance is measure relative to the hydrogen electrode. A metal with a negative standard potential has a thermodynamic tendency to reduce hydrogen ions in solution, whereas the ions of a metal with a positive standard potential have a tendency to be reduced by hydrogen gas. The reactivity series, shown in Scheme 5 (below), is an extension of the electrochemical series.

Scheme 5

| | | |
|---|---|---|
| K | Potassium | Most Reactive |
| Na | Sodium | |
| Ca | Calcium | |
| Li | Lithium | |
| Ba | Barium | |
| St | Stontium | |
| Mg | Magnesium | |
| Al | Aluminium | |
| Mn | Manganese | |
| Zn | Zinc | |
| Cr | Chromium | |
| Fe | Iron | |
| Cd | Cadmium | |
| Co | Cobalt | |
| Ni | Nickel | |
| Sn | Tin | |
| Pb | Lead | |
| H | Hydrogen | |
| Sb | Antimony | |
| Bi | Bismuth | |
| Cu | Copper | |
| Hg | Mercury | |
| Ag | Silver | |
| Au | Gold | |
| Pt | Platinum | Least Reactive |

Ordinarily, only a metal or element positioned higher in the reactivity series can reduce another metal or element that is lower down in the reactivity series e.g. iron can reduce tin but not potassium. It is appreciated that the order of the reactivity series can be (changed) inverted from that shown in Scheme 5. The terms "higher" and "lower" will be understood however as referring to a reactivity series having at the most reactive at the top and the least reactive at the bottom. In any event in the context of the present invention it will be appreciated that the metal of the metal salt is chosen so that it is reducible at the surface to which it is applied.

EXAMPLES 100 mL quantities of the cationic and radical compositions of the invention were prepared, and placed in a suitably sized bath.

A typical cationic composition is based upon:
 a. 3,4-Epoxycyclohexylmethyl-3,4-epoxycyclohexane carboxylate (77.6%)
 b. 1,4-Butanediol-Divinyl Ether (20%)
 c. Silver(1,5-Cyclooctadiene) Hexafluoroantimonate (2.4%)

A typical radical composition is based upon:
 d. Triethylene Glycol Dimethacrylate (91%)
 e. Benzoyl Peroxide (30% Water basis) (3%)
 f. Copper Tetrafluoroborate Hydrate (3%)
 g. Zinc Tetrafluoroborate Hydrate (3%)

Metal substrates (10×2.5 cm) were cleaned by wiping with acetone and dipped into the formulations. The metal substrates were submerged in the baths containing the formulations. The duration of immersion was proportional to the difference in standard potential between the surface and the metal salt in the composition, and the thickness of the desired coating—if required to be less than the self-limiting thickness. When coating/polymerisation was complete, residual monomer was removed by washing. The films formed were analysed by FTIR-ATR.

Figure 1:
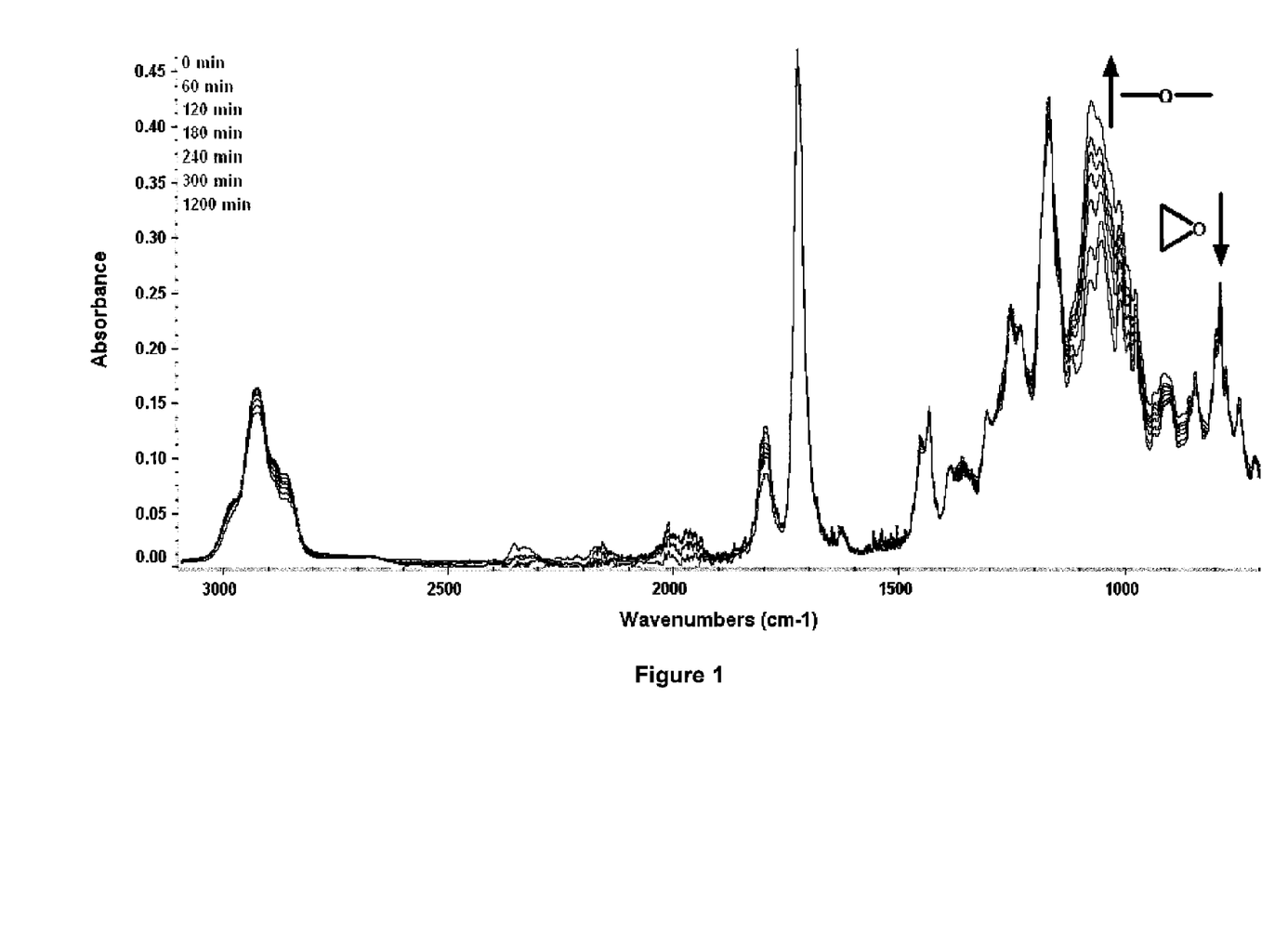
FIG. 1 is a FTIR-ATR spectra of surface promoted cationic polymerization on grit blasted mild steel substrate at 25° C. showing epoxide monomer decay (790 $cm^{-1}$) and polyether formation (1080 $cm^{-1}$): Region 3100 $cm^{-1}$ to 600 $cm^{-1}$.

FIG. 1 is a FTIR-ATR spectra of surface promoted epoxide coating on grit blasted mild steel at 25° C. The epoxide monomer has a characteristic IR stretch at 700 cm$^{-1}$. The desired polyether coating has a characteristic IR stretch at 1080 cm$^{-1}$. Iterative scanning of the sample over intervals of 10 mins illustrates increasing polyether concentration over time, substantiating the formation of a polymeric coating on the surface of the grit blasted mild steel.

Figure 2:
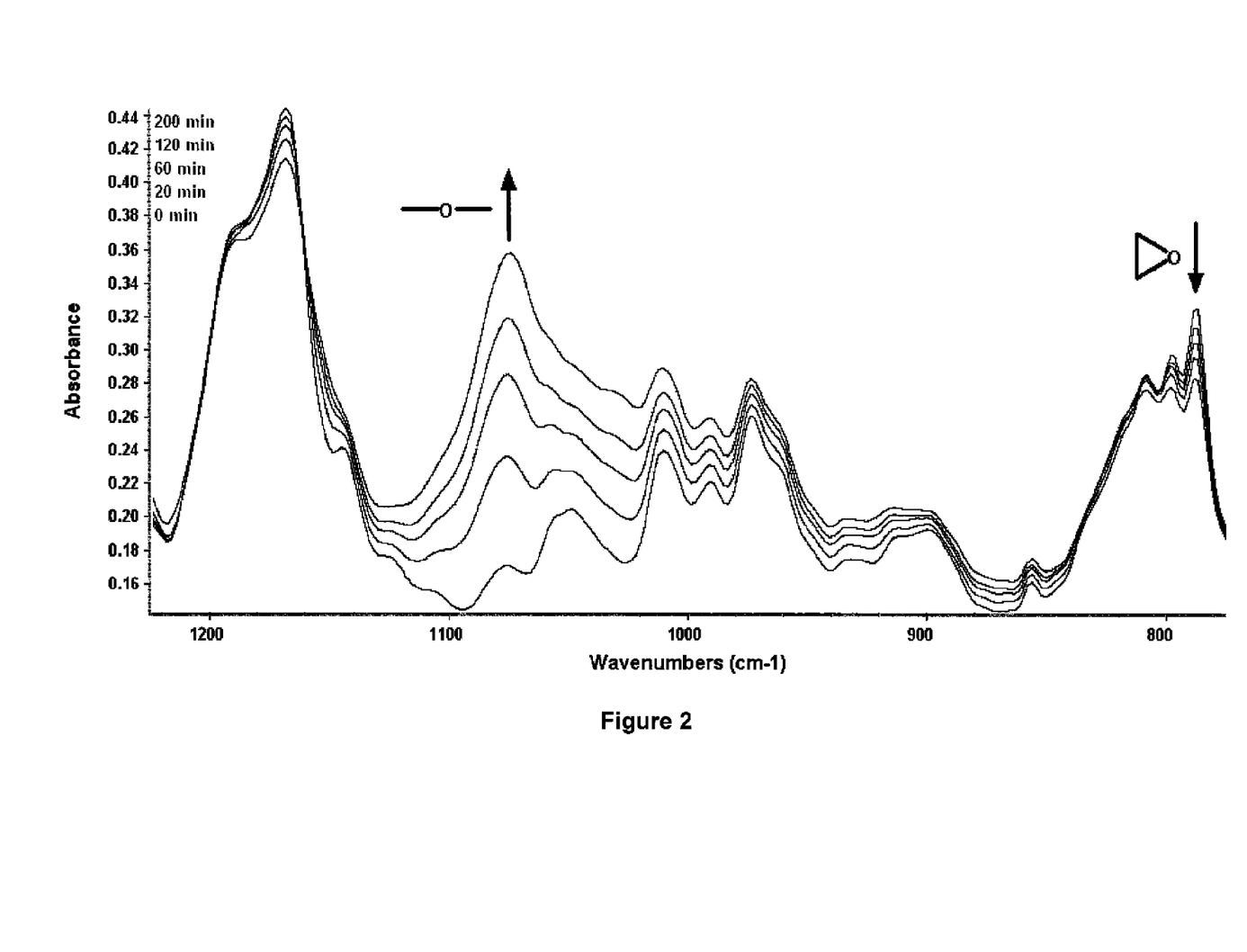
FIG. 2 is a FTIR-ATR spectra of surface promoted cationic polymerization on grit blasted mild steel substrate at 25° C. showing epoxide monomer decay (790 $cm^{-1}$) and polyether formation (1080 $cm^{-1}$): Region 1250 $cm^{-1}$ to 775 $cm^{-1}$.

An expanded view of the important 1190 cm$^{-1}$ to 760 cm$^{-1}$ region in FIG. 1 is given in FIG. 2. The IR spectrum clearly demonstrates that as polyether concentration increases over time the epoxide monomer concentration decreases.

Figure 3:
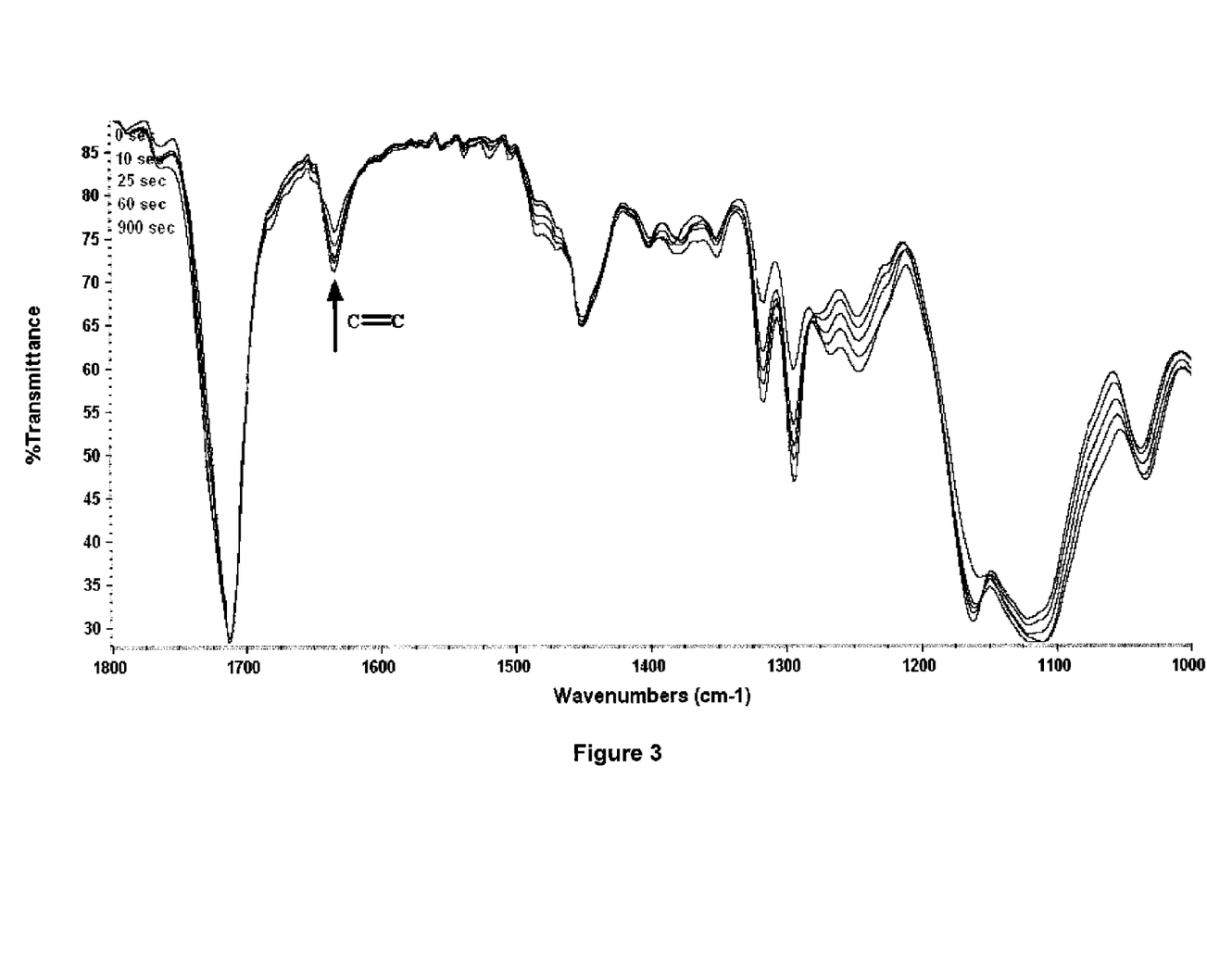
FIG. 3 is a FTIR-ATR spectra of surface promoted radical polymerization on grit blasted mild steel substrate at 25° C. showing decay of triethylene glycol monomer C=C stretching band (1635 $cm^{-1}$): Region 1800 $cm^{-1}$ to 1200 $cm^{-1}$.

Coating a grit blasted mild steel substrate with a radically curable monomer is shown in FIG. 3. The triethylene glycol dimethacrylate monomer has a characteristic C=C IR stretch at 1635 cm$^{-1}$. Iterative scanning of the sample over intervals of 30 seconds illustrates a decrease in the intensity of the C=C triethylene glycol dimethacrylate IR stretch at 1635 cm$^{-1}$, substantiating the formation of a polymeric coating on the surface of the grit blasted mild steel.

Figure 4:
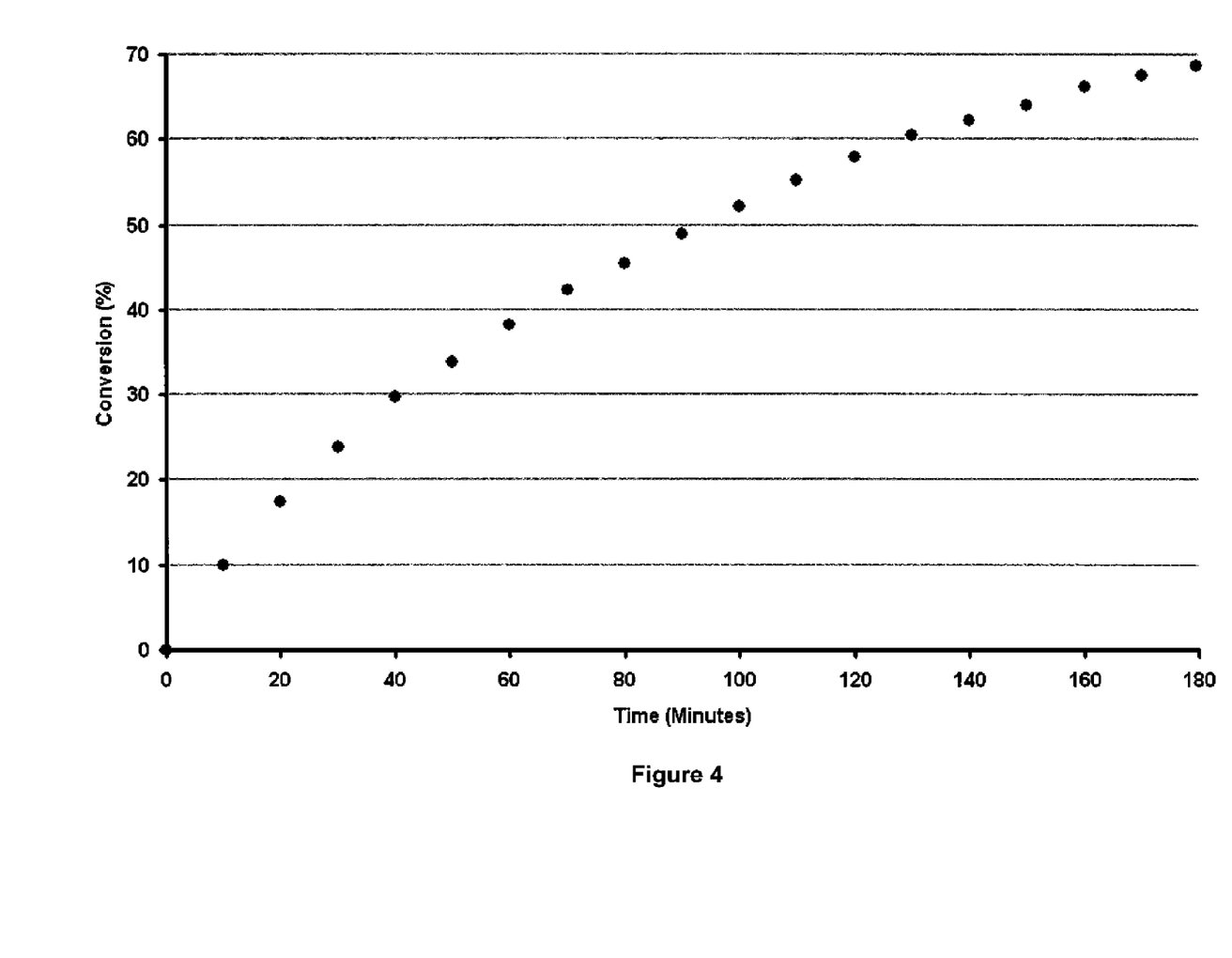
FIG. 4 is a plot of percentage polymerization versus time for the surface promoted cationic polymerization of CYRACURE 6110 (3,4-epoxycyclohexylmethyl-3,4-epoxycyclohexane carboxylate) (8.0 g), 1,4-butanediodivinyl ether (2.0 g) and [Ag(1,5-cyclooctadiene)$_2$] SbF$_6$ (0.25 mmol) as an initiator using grit blasted mild steel as the substrate at 20° C., monitored by FT-IR ATR and depicted in FIGS. 1 and 2.

A percentage polymerisation versus time plot for a cationically curable coating composition is given in FIG. 4. The coating composition comprises Cyracure 6110 (3,4-Epoxycyclohexylmethyl-3,4-Epoxycyclohexane Carboxylate) (8.0 g), 1,4-Butanediodivinyl Ether (2.0 g) and [Ag(1,5-Cyclooctadiene)$_2$] SbF$_6$ (0.25 mmol) using Grit Blasted Mild Steel as the Substrate at 20° C. The extent of polymerisation was determined utilising FTIR-ATR as per FIGS. 1 and 2 (vide supra). The change in peak intensity in the spectrum over time at 1080 cm$^{-1}$ is indicative of polyether formation, and thus polymerisation. The plot illustrates that the initial rate of polymerisation is quick and linear up to approximately 30 mins, whereupon the onset of a plateau is gradually observed.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:
1. A combination comprising:
 a surface constructed from a metal, metal oxide, or metal alloy, and
 a curable coating composition on the surface, the curable coating composition consisting essentially of:

(i) a cationically curable component; and
(ii) at least one metal salt having a standard reduction potential greater than the standard reduction potential of the surface, such that the metal salt is reduced at the surface, thereby initiating cure of the cationically curable component of the composition.

2. The combination according to claim 1, wherein the metal salt comprises a transition metal cation.

3. The combination according to claim 2, wherein the transition metal cation is selected from silver, copper and combinations thereof.

4. The combination according to claim 2, wherein the metal salt includes a counterion selected from the group consisting of $ClO_4^-$, $BF_4^-$, $PF_6^-$, $SbF_6^-$, $AsF_6^-$, $(C_6F_5)_4B$, $(C_6F_5)_4Ga$, carborane, triflimide, bis-triflimide, and combinations thereof.

5. The combination according to claim 1, wherein the surface is selected from the group consisting of iron, steel, mild steel, gritblasted mild steel, aluminium, aluminium oxide, copper, zinc, zinc oxide, zinc bichromate, and stainless steel.

6. The combination according to claim 1, wherein the cationically curable component has at least one functional group selected from the group consisting of epoxy, vinyl, vinyl ether, oxetane, thioxetane, episulfide, tetrahydrofuran, oxazoline, oxazine, lactone, trioxane, dioxane, styrene and combinations thereof.

7. A combination comprising
a surface constructed from a metal, metal oxide, or metal alloy, and
a curable coating composition on the surface, the curable coating composition consisting essentially of:
(i) a radically curable component;
(ii) a free radical generating component; and
(iii) at least one metal salt having a standard reduction potential greater than the standard reduction potential of the surface, such that the metal salt is reduced at the surface, thereby initiating cure of the radically curable component of the composition.

8. The combination according to claim 7, wherein the metal salt comprises a transition metal cation.

9. The combination according to claim 8, wherein the transition metal cation is selected from the group consisting of copper, iron, zinc and combinations thereof.

10. The combination according to claim 7, wherein the metal salt includes a counterion selected from the group consisting of naphthenate, ethylhexanoate, benzoate, nitrate, chloride, acetylacetonate, $ClO_4^-$, $BF_4^-$, $PF_6^-$, $SbF_6^-$, $AsF_6^-$, $(C_6F_5)_4B$, $(C_6F_5)_4Ga$, carborane, triflimide, bis-triflimide, and combinations thereof.

11. The combination according to claim 7, wherein the radical generating component is selected from the group consisting of peroxides, hydroperoxides, hydroperoxide precursors, persulfates and combinations thereof.

12. The combination according to claim 7, wherein the radical generating component is selected from the group consisting of Cumene Hydroperoxide, tert-Butyl hydroperoxide, Hydrogen peroxide, 2-Butanone peroxide, Di-tert-Butyl peroxide, Dicumyl peroxide, Lauroyl peroxide, 2,4-Pentanedione peroxide, 3,3,5,7,7-Pentamethyl-1,2,4-trioxepane, Benzoyl Peroxide and combinations thereof.

13. The combination according to claim 7, wherein the radically curable component of the coating composition has at least one functional group selected from the group consisting of acrylates, methacrylates, thiolenes, siloxanes, vinyls and combinations thereof.

14. The combination according to claim 7, wherein the surface is selected from the group consisting of iron, steel, mild steel, gritblasted mild steel, aluminium, aluminium oxide, copper, zinc, zinc oxide, zinc bichromate, and stainless steel.

15. A method of coating a substrate comprising applying a coating composition comprising:
(i) a cationically curable component; and
(ii) an initiator component comprising at least one metal salt;

to the substrate, wherein the standard reduction potential of the initiator component is greater than the standard reduction potential of the surface and wherein the substrate is constructed from a metal, metal oxide, or metal alloy.

16. A method of coating a substrate comprising applying a coating composition comprising:
(i) a radically curable component;
(ii) a free radical generating component; and
(iii) at least one metal salt;

to the substrate, wherein the standard reduction potential of the at least one metal salt is greater than the standard reduction potential of at least one of the substrates and wherein the substrate is constructed from a metal, metal oxide, or metal alloy.

* * * * *